United States Patent

Ninomiya et al.

[15] 3,675,224

[45] July 4, 1972

[54] COINCIDENT-CURRENT MAGNETIC CORE MEMORY WITH COMBINED INHIBIT AND SENSE WINDING

[72] Inventors: Shoichi Ninomiya; Masaaki Sakai; Sakae Oka, all of Kawasaki-shi; Kikunobu Kusunoki, Tokyo, all of Japan

[73] Assignees: Fujitsu Limited, Kawasaki-shi; Nippon Telegraph and Telephone Public Corporation, Tokyo, Japan; a part interest to each

[22] Filed: Aug. 21, 1969

[21] Appl. No.: 852,066

Related U.S. Application Data

[63] Continuation-in-part of Ser. No. 505,556, Oct. 28, 1965, abandoned.

[30] Foreign Application Priority Data

Oct. 31, 1964 Japan....................................39/61740

[52] U.S. Cl. .................340/174, 340/174 AC, 340/174 DA, 340/174 DC, 340/174 M

[51] Int. Cl......................G11c 5/02, G11c 5/06, G11c 11/06

[58] Field of Search................................340/174 M, 174 CR

[56] References Cited

UNITED STATES PATENTS 3,409,883 11/1968 Norton...............................340/174 R 3,548,391 12/1970 Perlman ..........................340/174 CR

OTHER PUBLICATIONS

Publication I– IBM Technical Disclosure Bulletin Vol. 3 No. 1 June 1960

*Primary Examiner*—James W. Moffitt

*Attorney*—Greene & Durr

[57] ABSTRACT

In a coincident-current magnetic core memory having the form of a matrix of toroidal magnet cores threaded by a pair of row and column half-select wires, a common inhibit and sense winding composed of two bifilar winding sections is wound back and forth in one direction with each of the sections being staggered upon passing from one to another of two groups of the cores and with one bifilar winding section being interlaced with the other winding section. A differential amplifier has its inputs each connected to one of the bifilar winding sections and an inhibit driver is connected to both the amplifier inputs.

6 Claims, 4 Drawing Figures

COINCIDENT-CURRENT MAGNETIC CORE MEMORY WITH COMBINED INHIBIT AND SENSE WINDING

Figure 1:
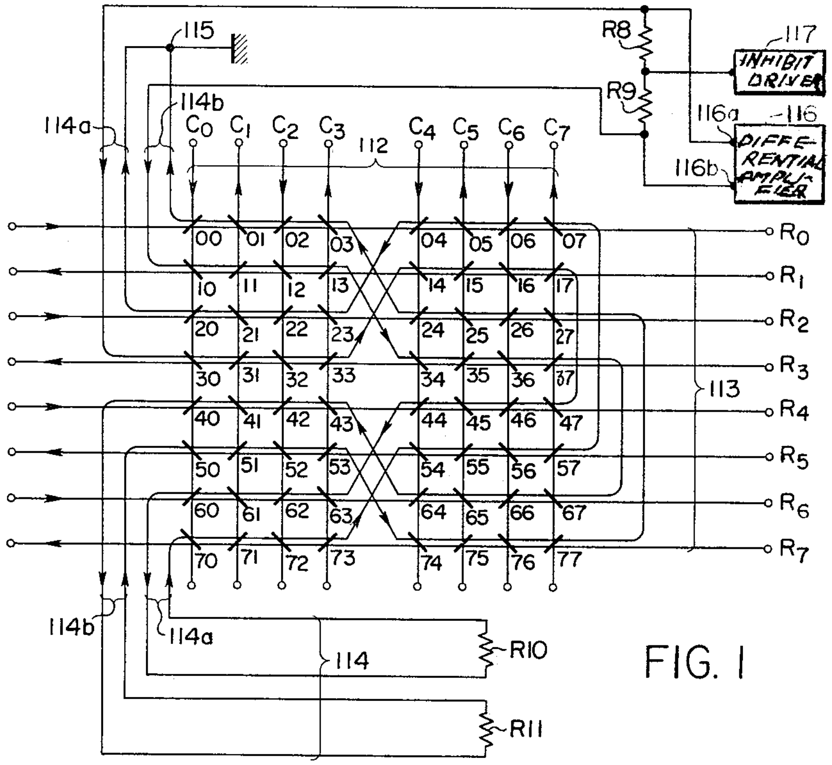

This application is a continuation-in-part of application Ser. No. 505,556, filed Oct. 28, 1965 and now abandoned.

The present invention relates to coincident-current magnetic core memory devices, more particularly to a core matrix or plane of the type embodying a combined inhibit and sense winding in addition to the conventional half-select write-in and read-out address wires or windings threading the rows and columns of the toroidal magnet cores.

There have already been proposed magnetic core memories utilizing a single winding to perform both the inhibit and sensing functions during the write-in and read-out operations, respectively. In the use of such memory devices, it has been found, aside from other difficulties, that sensing is not as positive and reliable as in the case of conventional memory devices utilizing separate inhibit and sensing windings. A reason thereof is due to the fact that the reading amplifier is influenced by the inhibit currents applied to the same winding. Since the amplitude of the inhibit currents is in excess of the amplitude of the sensing currents, a reading amplifier is required being capable of discriminating between the sensing and inhibit signals, the former of which are to be read out from the amplifier output, while the latter should be without effect on the amplifier or read-out circuits.

For the foregoing purpose, it has already been proposed to utilize a differential read-out amplifier connected with the combined inhibit and sense winding, or sections thereof, in such a manner as to result in a ready amplification of the sensing signals in accordance with the binary information stored in the memory or magnet cores being sensed, while cancelling the effect on the read-out amplifier by the inhibit signals applied to the same winding during a write-in operation. In other words, the sensing signals should be effectively amplified and detected during a read-out operation, while the inhibit signals should be balanced so as to produce no effect in the amplifier output during a write-in operation.

Aside from the cancellation of the inhibit currents by the differential amplifier in a magnetic core memory of the foregoing type, the amplifier serves simultaneously for the balancing of spurious signals or so-called half-select noise induced in the sections of the combined inhibit and sense winding by the cores of a selected row and column of the memory during a read-out operation. Such undesirable noise or interfering signals, being liable, by cumulative action, to result in erroneous read-outs, are caused in a known manner by the imperfect shape of the characteristic curve of the ferrite material of the cores, compared with an ideal rectangular magnetic characteristic.

It has been found by applicants that effective balancing of the half-select noise signals in the read-out circuit of the differential amplifier of a core memory of the referred to type is difficult to achieve in practice, whereby to result in residual noise liable, by cummulative action, to attain amplitudes sufficient to cause an erroneous read-out where zero output should occur according to the binary state of the respective memory core being sensed.

Applicants have discovered the reason of this unbalancing, at the inputs of the differential amplifier, of the spurious or half-select noise signals to be due to a difference in transit time of two signals to be balanced from the respective cores of the memory matrix, resulting thereby in a relative phase or time displacement of the signals at the amplifier inputs and a corresponding residual difference signal applied to and amplified by the amplifier. As a result, read-out errors may occur by cummulative action of the residual half-select noise signals, in the manner pointed out above. Such transit time differences are of an especially serious nature in the case of relatively large memory planes containing great numbers of magnet cores and being subjected to high speed sensing or read-out operations.

Accordingly, an important object of the present invention is the provision of a combined inhibit and sense winding in a coincident-current magnetic core memory of the referred to type, said winding being constructed and arranged in such a manner as to result in substantially constant transit times for the spurious or half-select noise signals to be balanced from the respective cores of the memory matrix to the inputs of the differential read-out amplifier.

Another object of the invention is the provision of a substantially inductance-free combined inhibit and sense winding for a coincident-current magnet core memory of the referred to type, whereby to substantially reduce or eliminate common-mode noise and other interference originating from outside magnetic fields.

Yet another object of the invention is the provision of an improved combined inhibit and sense winding for a coincident-current magnetic core memory of the referred to type, whereby distortion of the inhibit current pulses is substantially avoided.

Figure 2:
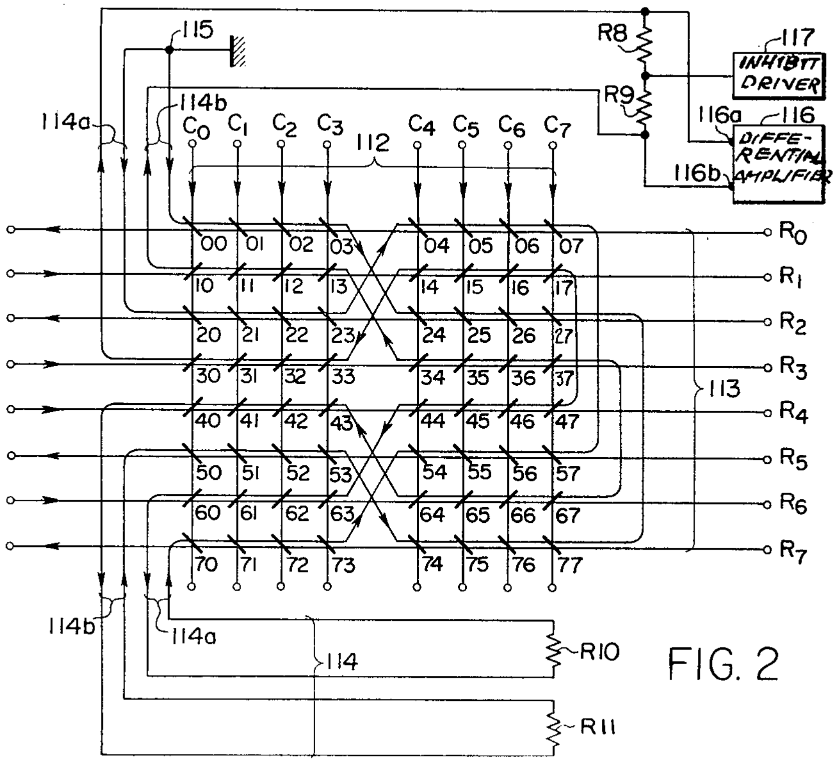
Figure 3:
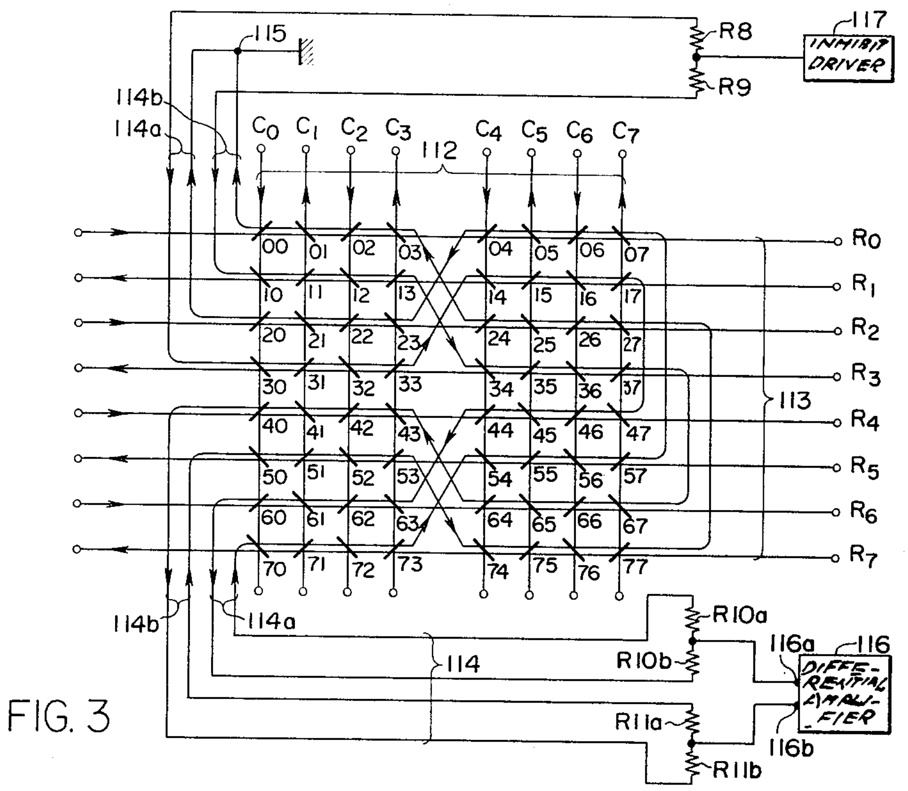
Figure 4:
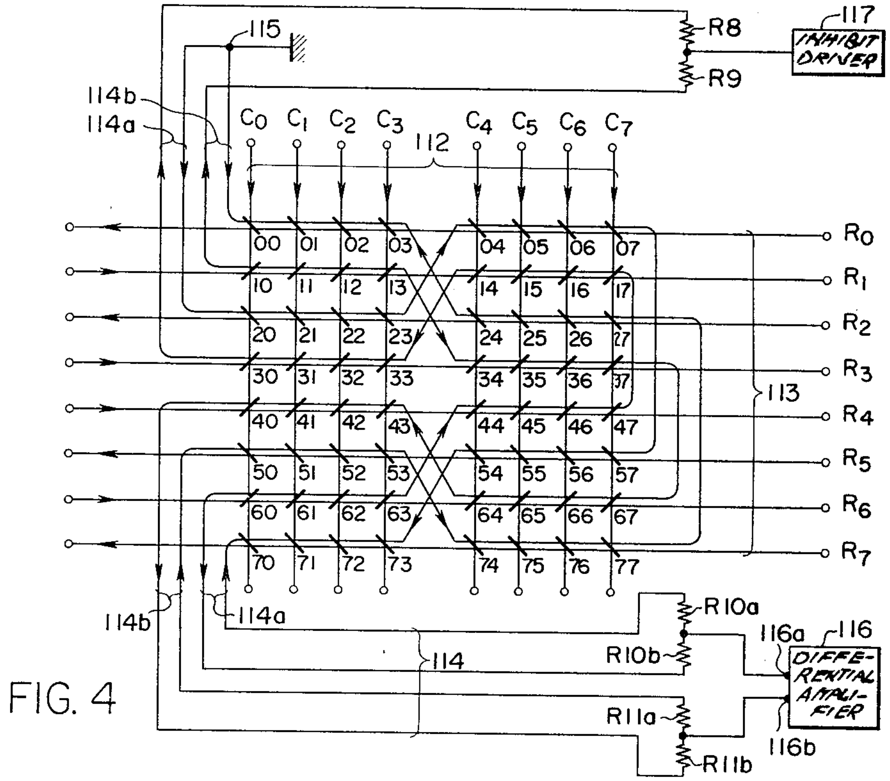

The invention, both as to the foregoing and anciliary objects as well as novel aspects thereof, will be better understood from the following detailed description taken in conjunction with the accompanying drawings forming part of this disclosure and in which:

FIG. 1 is a schematic diagram of a coincident-current magnetic core memory embodying a combined inhibit and sense winding constructed in accordance with the principles of the invention; and FIGS. 2–4 are diagrams similar to FIG. 1 and showing modifications of the invention.

Like reference characters denote like parts in the different views of the drawings.

With the foregoing objects in view, the invention, according to one of its aspects, involves generally the provision of a coincident-current magnetic core memory of the referred to type comprising a matrix of rows and columns of magnet cores threaded in a conventional manner by sets of half-select row and column address wires or windings, and a common inhibit and sense winding threading all of the cores of the matrix and being comprised of two bifilar winding sections wound back and forth in the same direction, for example parallel to the rows of cores of the matrix, with the adjoining bifilar wires of each section traversing adjacent rows of the matrix and being staggered in passing from one half or group of cores to the other group in respect to a center line parallel to the columns in the example mentioned. Both bifilar winding sections, being interlaced throughout the entire matrix plane, are connected each to a separate input of a differential read-out amplifier, while an inhibit driver is connected to both the amplifier inputs, to prevent the inhibit currents or pulses from affecting the amplifier, on the one hand, and to enable a read-out or sensing signal to be readily passed and amplified, while at the same time eliminating or balancing corresponding half-select noise signal components originating from both winding section by the differential amplifying action.

With special reference to the half-select noise balancing effect of the amplifier, it can be seen that, due to the special arrangement of and use of bifilar sections of the inhibit and sense winding, the current path of the balancing signals from the cores of a selected row and column during a read-out operation to the respective amplifier inputs are substantially alike, thereby to ensure a full and effective cancellation or balancing of the signals by the amplifier, in a manner as will become more apparent as the description proceeds in reference to the drawings. Read-out errors are thus prevented effectively and reliably.

At the same time, the bifilar construction of the inhibit and sense winding sections, results in a substantial suppression of common-mode noise or interference by outside magnetic fields, such as that originating from wires or windings of the same or an adjacent memory plane of a multi-plane memory of conventional construction. Finally, with the bifilar winding sections being substantially inductance-free, distortion or time delay of the inhibit current pulses are substantially avoided, resulting thereby in increased accuracy of the write-in operations, these and other features as well advantages of the invention becoming more apparent from the description of the drawings proceeds as follows.

Referring more particularly to FIG. 1, a plurality of toroidal magnet cores are arranged in a known manner to form a rectangular matrix, there being shown, by way of example, 8 rows and columns of cores with the resulting 64 cores being denoted by numerals 00–77 in the drawing. A set of 8 half-select column address wires $C_0$–$C_7$, collectively denoted by numeral 112, are arranged to thread the vertical columns of magnet cores and, similarly a set of half-select row address wires $R_0$–$R_7$, collectively denoted by numeral 113, are arranged to thread the horizontal rows of magnet cores, in accordance with conventional practice. A common inhibit and sense winding, collectively denoted by numeral 114, traverses all of the cores of the matrix in accordance with the invention and in the manner shown and described in greater detail in the following.

More particularly, the inhibit and sense winding 114 is divided into two bifilar winding sections **114*a* and 114*b*, respectively, which are threaded, in the same direction, with their adjacent bifilar wires traversing adjacent rows $R_0$–$R_7$ and being staggered while passing from one half-group of cores to the other group on either side of the center or symmetry line of the matrix parallel to the columns in the example illustrated. The direction of staggering is alternately reversed as the bifilar winding sections 114*a* and 114*b*** traverse the cores from the top to the bottom of the matrix plane and, furthermore, the winding sections are mutually interlaced, in the manner shown and for the purpose as will become more apparent as the description proceeds.

More specifically, in the example shown the bifilar winding section **114*a* has one free end electrically connected to the input terminal 116*a* of a balancing or differential amplifier 116 and is traced as follows: from terminal 116*a* through cores 30–33, 14–17, 47–44, and 63–60 to one end of a resistor $R_{10}$, replacing the common and usually reversely bent end of the bifilar wires, and back from the other end of resistor $R_{10}$ through cores 70–73, 54–57, 07–04 and 23–20 to ground or reference point 115**.

Similarly, the bifilar winding section **114*b* has one end electrically connected to the other input terminal 116*b* of the amplifier 116 and is traced as follows: from terminal 116*b* through cores 10–13, 34–37, 67–64, and 43–40 to one end of a resistor $R_{11}$, being similar to resistor $R_{10}$, and back from the other end of resistor $R_{11}$ through cores 50–53, 74–77, 27–24, and 03–00 to ground or reference terminal 115. Both amplifier input terminals 116*a* and 116*b* are connected through two identical resistors $R_8$ and $R_9$ in series to the common junction of which is connected an inhibit driver 117, whereby both winding sections 114*a* and 114*b* are connected in parallel to the inhibit driver 117 and the latter is connected to both inputs 116*a* and 116*b* of the amplifier 116**.

By the arrangement of the inhibit and sense winding 114 in the manner shown and described in the foregoing, not only is the inductance of the bifilar sections **114*a* and 114*b*** substantially cancelled, to prevent distortion and/or time delay of the inhibit current pulses during the write-in operations, resulting thereby in increased effectiveness and reliability of the write-in or inhibit functions, while the sensing or read-out signals are effectively amplified, but half-select as well as other (common-mode) noise or interference is practically eliminated by both the winding and the amplifier, in a manner as will become further apparent from the description of the operation of FIG. 1 as follows.

While the winding 114 is excited, during a write-in operation, by an inhibit current pulse supplied by the driver 117, inhibit currents pass through each of the sections **114*a* and 114*b* in parallel. More specifically, the current flow through the bifilar winding section 114*a* is traced as follows: from the inhibit driver 117 through resistor $R_8$, one of the wires of the bifilar section 114*a*, resistor $R_{10}$, and the remaining or return wire of the winding section 114*a* to ground or reference terminal 115. Similarly, the current flow through the bifilar winding section 114*b* is traced as follows: from the inhibit driver 117 through resistor $R_9$, one wire of the bifilar winding 114*b*, resistor $R_{11}$, and the remaining or return wire of the winding section 114*b* to ground or reference terminal 115**.

At the same time, that is, during the application of a write-in current pulse by the driver 117, one of the column-selecting wires 112 and one of the row-selecting wires 113 are excited by half-select address current pulses, whereby to switch the core at the intersection of the selected row and column from one to the other magnetic state, such as from binary "0" to binary "1" (provided all the cores have been previously cleared to zero in accordance with conventional practice), excepting the selected or addressed core one of the half-select currents of which is cancelled by the inhibit current, to result in no change or the write-in of a binary "0" in the respective core. The read-out amplifier 116 is not affected by the inhibit currents resulting in the application of equal potentials to the input terminals **116*a* and 116*b***, whereby to cause a balancing or cancellation of the applied potentials, or the absence of any output signal in an associated read-out circuit, such as a memory register or the like.

While the winding 114 operates as a sense winding during a read-out operation, the inhibit driver 117 remains idle. During this operation, one of the column-selecting wires 112 and one of the row-selecting wires 113 are excited by half-select currents of opposite sense to the half-select write-in currents, whereby to cause the magnet core at the intersection of the selected row and column to switch its state from binary "1" to binary "0", or to result in no change where the addressed core is already in "0" state, in accordance with conventional practice. The resulting variations of the magnetic flux in the switched core or cores result in a read-out signal being applied to the input of the amplifier. More specifically, the sensing or read-out signals induced in the winding section **114*a* are applied to the amplifier input 116*a* and the sensing signals induced in the winding section 114*b* are applied to the amplifier input 116*b***, whereby to cause the signals to be amplified and transmitted to an associated read-out register or the like output circuit.

Differential or balanced amplifiers and their operations are well known in the art. If common-phase signals are impressed upon both the amplifier inputs, no signal occurs in the common output circuit, while when oppositely-phased input signals are applied, or only one of the inputs is excited, an amplified out-put signal is produced and impressed upon the circuit connected to the amplifier.

In the following, there will be discussed the occurrence of half-select noise and its full and effective balancing or cancellation by the invention, especially in the case of relatively large memory planes and/or high-speed read-out operations.

Aside from effecting or preventing switching of an addressed core at the intersection of a selected row or column during a sensing or read-out operation, the half-select currents in the remaining cores of the selected row or column produce what is known as half-select noise signals in the winding 114, due to the imperfection of the magnetic characteristic of the ferrite core material. These noise signals are eliminated by the winding arrangement according to the invention as a result of one half of the cores of each row and column being traversed by winding section **114*a* and of the remaining half of the cores of each row and column being traversed by the winding section 114*b*, in such a manner that, with the winding sections connected to the amplifier terminals 116*a* and 116*b*** in the manner shown and described, corresponding signals originating from both sections will be balanced by the amplifier. As pointed out herein before, such noise balancing as obtained with previous arrangements utilizing a common inhibit and sense winding has been found unsatisfactory and incomplete due to the different transit times for the signals to be balanced from the respective cores of the memory matrix to the associated amplifier input terminals.

This drawback and defect of the prior art arrangements is substantially overcome by the specific construction and arrangement of the winding 114 as shown by the instant application, as will become more apparent from the following.

Assuming the address of core 00, that is, excitation by half-select current pulses of the column wire $C_0$ and row wire $R_0$, spurious or half-select noise signals will be induced in the winding 114 by cores 10, 20, 30, 40, 50, 60 and 70 of column $C_0$ as well as by the cores 01, 02, 03, 04, 05, 06 and 07 of row $R_0$. Inasmuch as one half of the cores of column $C_0$, that is cores 00, 10, 40, 50 are linked with the winding section **114*b* and the other half of the cores of column $C_0$, that is, cores 20, 30, 60 and 70 are linked with the winding section 114*a*, and similarly, inasmuch as one half of the cores of row $R_0$, that is cores 00, 01, 02, 03 are linked with winding section 114*a* and the other half of the cores of row $R_0$, that is cores 04, 05, 06, 07 are linked with winding section 114*b***, it is seen that corresponding half-select noise signals induced in one of the winding sections are balanced in the amplifier by the half-select noise signals induced in the other winding section.

Furthermore, with reference to the noise signals caused by the cores of column $C_0$, it can be seen that the line length from the core 10 to the amplifier terminal **116*b* approximately equals the length from the core 30 to the amplifier 116*a*. Similarly, the length from the core 40 to terminal 116*b* approximately equals the length from the core 60 to terminal 116*a* and, finally, the length from the core 50 to the terminal 116*b* approximately equals the length from the core 70 to the terminal 116*a*. As a consequence, any time delays or transit times of the signals being balanced are substantially equal, leaving practically no differential, in respect to both amplitude and phase, between the signals applied to the amplifier inputs 116*a* and 116*b* and resulting thereby in a complete and effective half-select noise balancing or cancellation by the amplifier 116. The same applies to the remaining residual or common-mode noise or interference induced in the winding 114, as far as cancellation has not been effected by the bifilar arrangement or construction of the winding sections 114*a* and 114*b***.

With specific reference to the noise signals caused by the cores of row $R_0$, it is seen that the line length from the cores traversed by winding section **114*a* to the amplifier terminal 116*a* is slightly shorter, by an amount equal to the spacing between cores 00 and 03, than the lengths from the cores traversed by the winding section 114*b* to the amplifier terminal 116*b*. It should be noted, however, that this difference is practically negligible compared with the total length of the windings 114*a* and 114*b*, whereby to have practically no effect on the balancing of the signals by the amplifier 116**.

As can be seen, the equality of the current paths or transit times of the two noise signals to be balanced is due essentially to the bifilar arrangement of the winding sections **114*a* and 114*b*** by causing both signals to pass by the common ends of the bifilar wires, or resistors $R_{10}$ and $R_{11}$, respectively, irrespective of the positions of the respective magnet cores from which the signals originate.

The condition as discussed in the foregoing in respect to core 00 applies to all the other cores of the memory, whereby to ensure a complete and effective noise elimination in a matrix with combined inhibit and sense winding construction according to the present invention.

In FIG. 1, the magnet cores are inclined alternately in opposite directions relative to and along both the row and column address wires $C_0$–$C_7$ and $R_0$–$R_7$, respectively. According to the modified arrangement as shown by FIG. 2, the incline angles of the cores vary from row to row and from core to core of each column. This results in both a reduction of size of the matrix as well as more easy threading of the cores.

Referring to the embodiment according to FIG. 3, the latter differs from FIG. 1 essentially by the connection of the balancing amplifier 116 to the center points of the terminal resistors $R_{10}$ and $R_{11}$ of the winding sections **114*a* and 114*b* being shown each in the form of two resistors in series $R_{10a}$, $R_{10b}$, and $R_{11a}$, $R_{11b}$, respectively. FIG. 4 is similar to FIG. 3 except for the arrangement of cores, the arrangement of cores in FIG. 4 differing from the arrangement of cores in FIG. 3 in the same way as said arrangements differ in FIGS. 2 and 1**.

The embodiment according to FIG. 1 has the advantage of greater compactness and shorter wire lengths due to the close mounting of the amplifier 116 and inhibit driver 117, but has the disadvantage of different transit times of the inhibit and sense signals, respectively. On the other hand, the embodiment according to FIG. 3, while resulting in substantially equal transit times of both the inhibit and sense signals, has the disadvantage of a more complex wiring. In practice, either of the alternative arrangements may be used, to suit existing constructional and operating conditions or requirements.

In the foregoing the invention has been described in reference to a specific exemplary and illustrative device. It will be evident, however, that variations and modifications, as well as the substitution of equivalent parts or devices for those shown herein, may be made without departing from the broader spirit and scope of the invention.

We claim:

1. A coincident-current magnetic core memory comprising in combination:

1. a matrix composed of a plurality of toroidal magnetic cores arranged in rows and columns according to a rectangular coordinate system,
2. first and second sets of half-select address wires respectively threading the cores of said rows and columns for effecting memory write-in and read-out operation,
3. a common inhibit and sense winding threading all of said cores and consisting of first and second bifilar winding sections each wound back and forth in the direction of said rows,
4. each of said bifilar winding sections arranged with its adjoining wires threading adjacent cores of said rows and both said winding sections being staggered upon passing from one half group to the other half group of said cores on the opposide sides of the center line of said matrix parallel to said columns, and
5. said first bifilar winding section being interlaced with said second bifilar winding section throughout the entire plane of said matrix,
6. a differential amplifier having a pair of inputs each effectively connected to one of said winding sections, and
7. an inhibit driver connected to said first and second winding sections in parallel and to both said inputs of said amplifier.

2. A magnetic core memory as claimed in claim 1, including a pair of resistors each connecting the common ends of the wires of one of said winding sections.

3. A magnetic core memory as claimed in claim 1, wherein the inputs of said amplifier are connected through a resistor, wherein the free ends of the wires of said winding sections are connected each to an input of said amplifier and the remaining free ends of said wires are connected to the amplifier reference point, and wherein said inhibit driver is connected to the center point of said resistor.

4. A magnetic core memory as claimed in claim 1, wherein one each of the free ends of each of said winding sections are connected through a first resistor and the remaining free ends of said sections are connected to the reference point of said amplifier, wherein the common ends of said winding sections are connected through identical further resistors, and wherein said amplifier has its inputs connected to the center points of said further resistors and said inhibit driver is connected to the center point of said first resistor.

5. A magnetic core memory as claimed in claim 1, wherein said bifilar winding sections are staggered alternately in different directions while passing from one to the other of said groups of magnet cores.

6. In a coincident current magnetic core storage matrix of the type which comprises magnetic cores each having a substantially rectangular hysteresis loop, the cores adapted each for memory of one-bit information being at the intersection of row-selecting and column-selecting lines interlaced with each other, the improvement comprising 1. a sense-inhibit winding formed of first and second bifilar winding sections each wound back and forth in the direction of said rows, each core of the matrix being threaded only once with one or the other of said winding sections,
2. each of said bifilar winding sections arranged with its adjoining wires threading adjacent cores of said rows and both of said winding sections being staggered upon passing from one half group to the other half group of said cores on the opposite sides of the center line of said matrix parallel to said columns,
3. said bifilar windings being further constructed and arranged so that windings which pass through adjacent rows of the matrix always constitute a neighboring pair of current-going and current-returning lines,
4. a differential amplifier having a pair of inputs each effectively connected to one of said winding sections, and
5. an input driver connected to said first and second winding sections.

* * * * *